US006796487B2

(12) United States Patent

Shoemaker, Jr.

(10) Patent No.: US 6,796,487 B2
(45) Date of Patent: Sep. 28, 2004

(54) VIDEO TICKET COUNTER

(76) Inventor: Stephen P. Shoemaker, Jr., 140 The Village #401, Redondo Beach, CA (US) 90277

( * ) Notice: Subject to any disclaimer, the term of this patent is extended or adjusted under 35 U.S.C. 154(b) by 162 days.

(21) Appl. No.: 10/008,878

(22) Filed: Nov. 8, 2001

(65) Prior Publication Data

US 2002/0056772 A1 May 16, 2002

Related U.S. Application Data

(60) Provisional application No. 60/247,061, filed on Nov. 10, 2000.

(51) Int. Cl.[7] .............................................. G06F 17/00
(52) U.S. Cl. .................. 235/375; 235/383; 235/462.14
(58) Field of Search ................................ 235/375, 381, 235/384, 385, 386, 475, 476, 477, 462.14, 478; 902/17, 18, 21, 23

(56) References Cited

U.S. PATENT DOCUMENTS

| | | | | | |
|---|---|---|---|---|---|
| 4,684,792 | A | * | 8/1987 | Nickels, Jr. | 235/384 |
| 4,798,942 | A | * | 1/1989 | Aubrey | 235/384 |
| 4,982,337 | A | * | 1/1991 | Burr et al. | 700/235 |
| 4,983,817 | A | * | 1/1991 | Dolash et al. | 235/462.04 |
| 5,211,093 | A | | 5/1993 | Horniak | 83/426 |
| 5,290,033 | A | * | 3/1994 | Bittner et al. | 463/25 |
| 5,444,750 | A | * | 8/1995 | Stewart et al. | 377/8 |
| 5,943,241 | A | * | 8/1999 | Nichols et al. | 700/232 |
| 5,996,457 | A | * | 12/1999 | Wingeron, Jr. | 83/349 |
| 6,280,326 | B1 | * | 8/2001 | Saunders | 463/25 |
| 6,336,219 | B1 | * | 1/2002 | Nathan | 725/91 |

* cited by examiner

*Primary Examiner*—Michael G. Lee
*Assistant Examiner*—Kimberly D. Nguyen
(74) *Attorney, Agent, or Firm*—Fulwider Patton Lee & Utecht, LLP

(57) ABSTRACT

A system suitable for counting strings of arcade type tickets comprising a transport mechanism, a sensing system for reading bar coded information and counting marks, a computer program and computer to tally, sort and compile management reports, and a video monitor to display the counting results, or additionally, display entertainment items or advertising to the customer while using the counter. The transport mechanism is especially designed to handle the new "paper" style tickets and is capable of handling tickets of varying sizes.

29 Claims, 3 Drawing Sheets

VIDEO TICKET COUNTER

CROSS REFERENCE TO RELATED APPLICATIONS

This application claims the benefit of U.S. Provisional Patent Application No. 60/247,061 filed on Nov. 10, 2000 and is incorporated herein by reference.

BACKGROUND OF THE INVENTION

This invention addresses the problem created by the practice in the amusement and arcade business of regarding customers with large numbers of redeemable tickets which are typically emitted from a gaming machine in a continuous strip from a ticket supply roll in the machine. The business operator needs to be able to count the tickets, account for all tickets to avoid fraud and theft, and to destroy tickets once redeemed to prevent reuse.

Two ticket counters for the purpose described are known to be currently available and in use at the present time. Both are designed for "standard card tickets" and do not work with a new form of "paper" tickets now in use by the inventor. The two known machines are provided by Smart Industries and by Deltronics Labs. (U.S. Pat. No. 5,211,093).

The problems arise because of the differences between typical "theater" type tickets and the new "paper" type tickets. Problems arise from two fundamental differences. One is that the method of "reading" the "paper" tickets differs greatly from that of reading the "standard" tickets. A second source of problems is the differences in the physical dimensions and form of the various tickets. Not only are there basic differences between the forms of the "paper" and the "standard" tickets, but also there are variations in the dimensions of "standard" type tickets produced by different manufacturers. For example, tickets produced by Globe Ticket and Label Company are one 1/32 inch narrower than those produced by National and Muncie. In this last situation of small differences in the physical dimensions of the tickets, the user is required to readjust the ticket guides of the machine if the tickets in use are of different dimensions from those to which the manufacturer set the machine at the factory. The "standard" tickets have a small notch or separation portion between tickets that provides the mechanism for triggering the counter as the tickets pass through the counting machine. The machines currently in use employ a wheel driven mechanism for the ticket transport. This mechanism does not transport the "paper" tickets well.

The currently used machines perform only limited functions. They count the tickets; they display the count on an LED numerical display; they print a receipt for the customer; and lastly they destroy the ticket with a shredding mechanism.

SUMMARY OF THE INVENTION

The present invention provides two significant improvements. First, its improved ticket transport mechanism is capable of effectively transporting both the new "paper" type tickets as well as the "standard" type tickets, including those with different physical dimensions. Secondly, it provides a video counting system that is capable of multiple functions. The video counting system can not only display the ticket count in a conventional numerical manner, but also the display screen can be used for numerous other visual communications, such as advertising, showing movies or cartoons to the customer, or displaying other information of interest to a customer, etc.

When a customer inserts a long string of tickets to be counted an appreciable amount of time is required for the counting process. The video system can be arranged to enable the customer who is waiting while the tickets are being counted to be amused by playing a trivia quiz game, or playing dexterity games, or some other similar type diversion.

The video enhancement of the counting system would be more fun and much more interesting for the customer than simply watching an LED counter display, and thus would encourage customer use of the counter.

A computer is needed to drive the video. The computer would expand the capabilities of the system beyond that of simply counting tickets. The computer would enable the system not only to count the tickets, count the receipts printed and keep track of statistics, but also would enable the system to allow access by remote computers useful for verifying the authenticity of receipts.

DETAILED DESCRIPTION OF THE PREFERRED EMBODIMENTS

Overall Description

Figure 1:
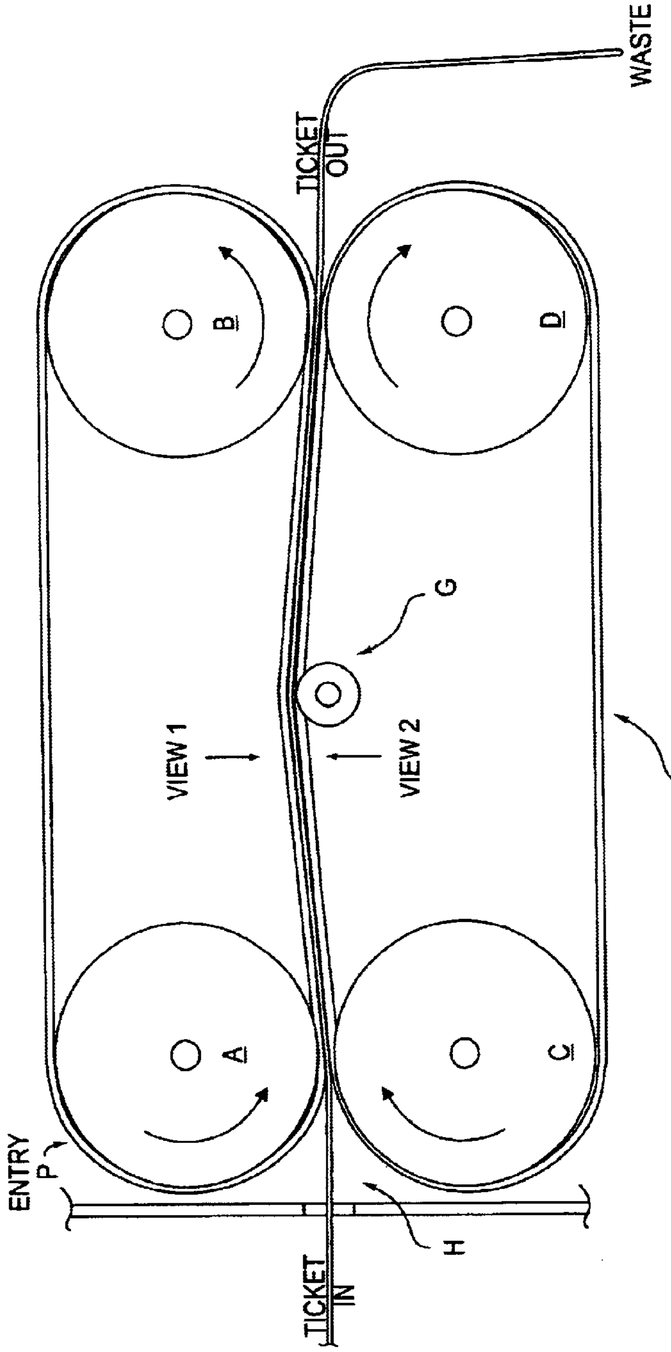
FIG. 1 is horizontal side view of the ticket transport mechanism showing the belts and rollers for conveying the tickets past the sensors. View 1 and view 2 in the drawing represent the sensors for reading the data on the tickets.
Figure 2:
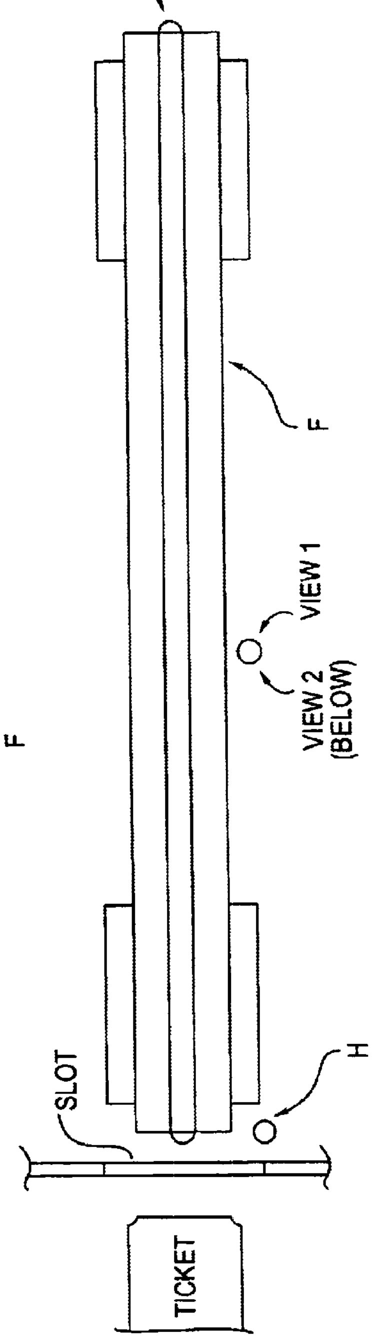
FIG. 2 is a plan view of the transport mechanism showing the relationship of the two belts.
Figure 3:
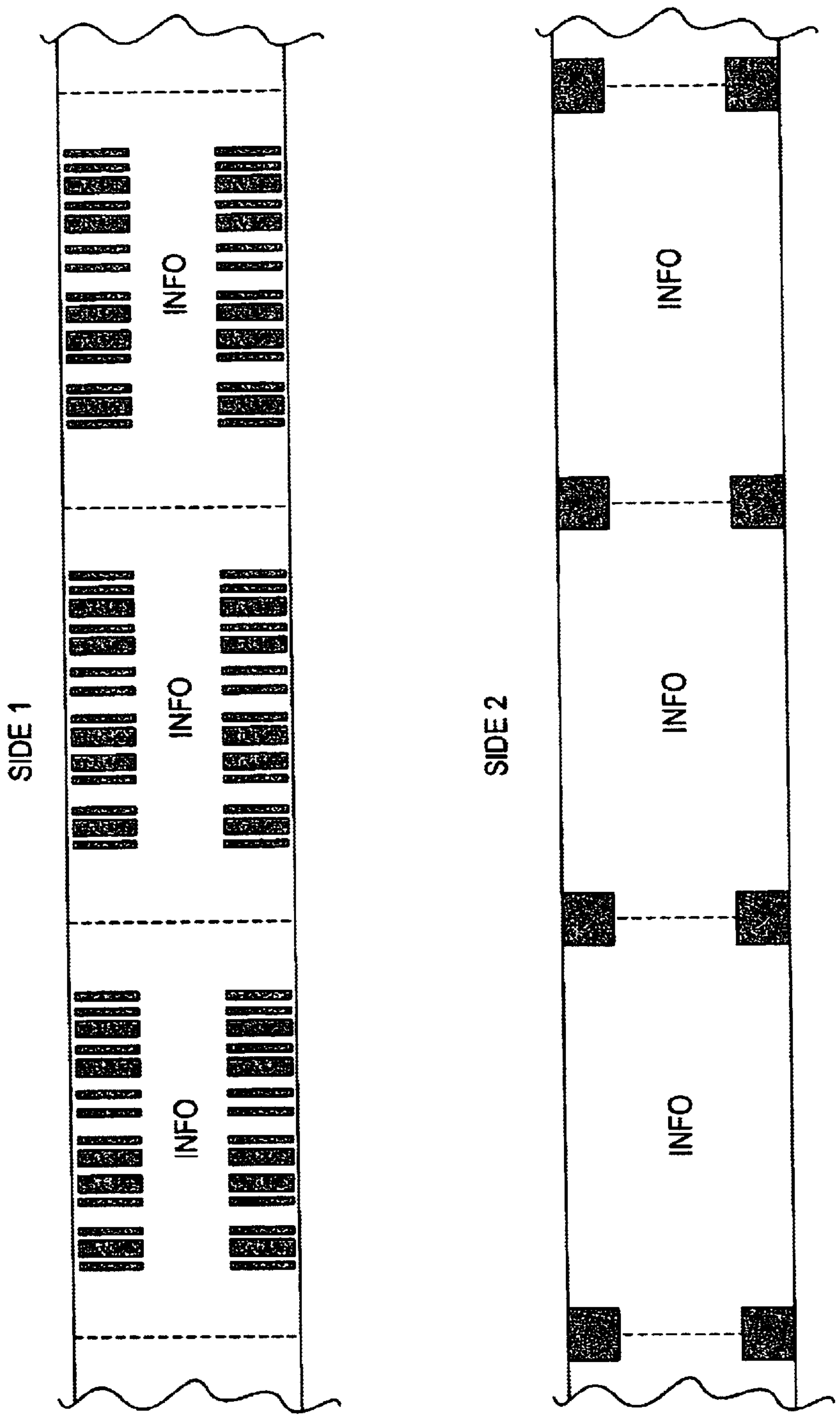
FIG. 3 shows both sides of the new "paper" ticket and the positioning of the longitudinal edge bands for emplacement of the bar codes on one side of the ticket and the opaque squares at the corners of the other side of the ticket.
Figure 4:
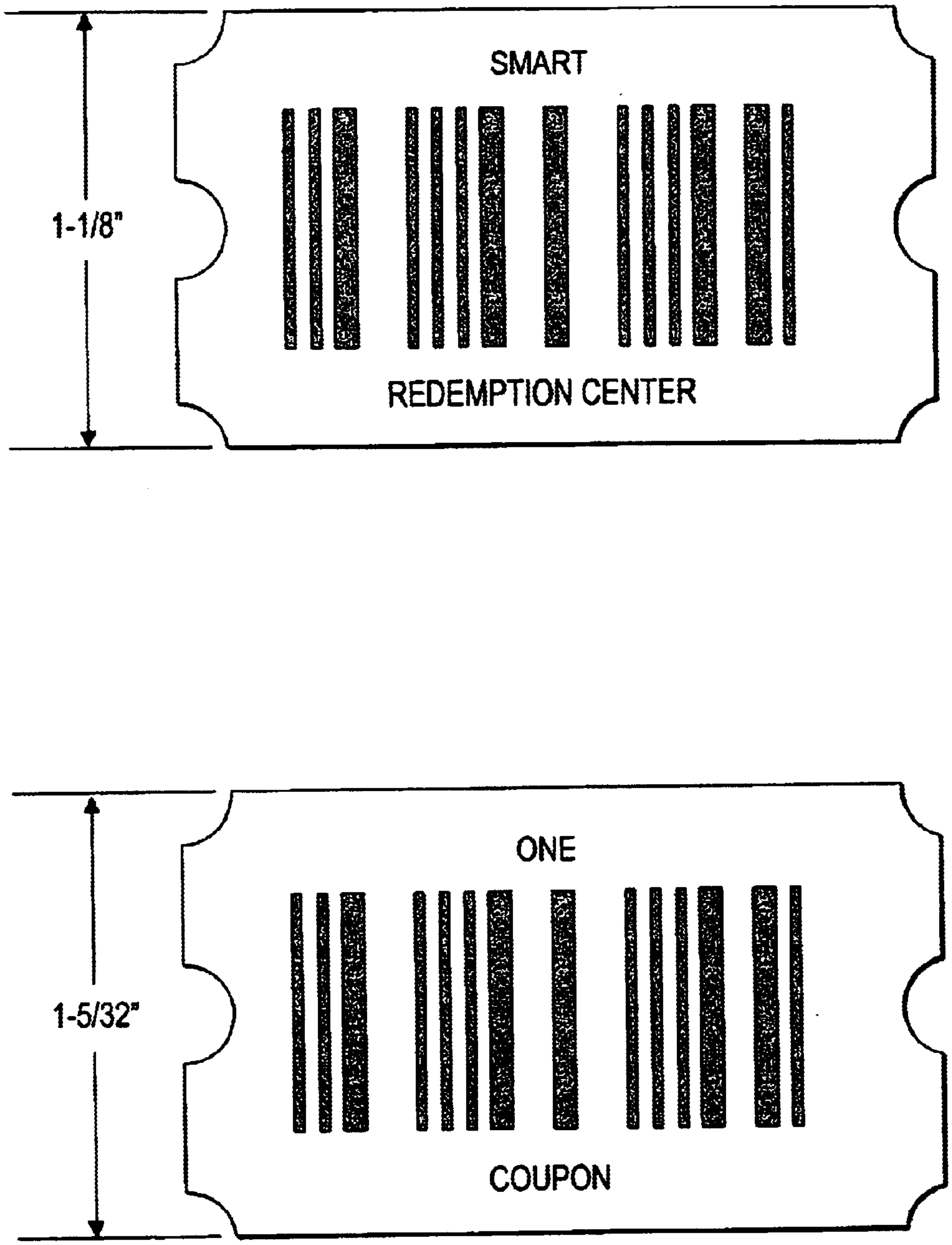
FIG. 4 shows photocopies of two of the standard arcade type tickets.

The invention solves the problem of effectively transporting tickets of various sizes and paper types and of accurately counting by holding the tickets centered between two continuous belts as they are carried through the counting machine. The belts and the tickets are each of such width that the longitudinal edges of the tickets extend beyond the edges of the belts so that sensors positioned at the sides of the belts can read information printed in bands running the length of the ticket. The sensors send the count data to a computer equipped with a computer program to tally the count. The output of the computer program sends the count information to a video display terminal. If desired, the data can be sent to another remotely located computer for collecting similar data from a plurality of counting machines, whereupon centralized accounting and verification procedures for the entire business can be executed. Upon completing passage through the counting mechanism, the tickets then pass through a conventional shredding mechanism and to waste collection.

The New "Paper" Tickets

The new "paper" tickets are printed on a continuous strip of suitable paper stock about one to one and a quarter inches in width. The ticket stock is sufficiently translucent to permit sensors to read light passing through the stock. Individual tickets are formed by simple perforations across the strip at about every one and one-half to two inches. The perforations serve to enable separation of the tickets individually from the strip.

Bar codes may be used for security purposes, such as, for example, identifying the establishment from which the ticket was purchased, date and time of purchase, and the redemption values of the ticket. Bar codes are printed on each edge of the ticket within a quarter inch wide band running the length of the ticket. The bar codes are printed in the longitudinal bands on both edges of one side of the ticket. The bar codes are printed with translucent ink that does not affect the original ticket-vending dispenser but can be seen by the bar code reader. This ink could be fluorescent type ink or one of any number of readable inks. Counting markers are printed on the other side of the tickets. As one example of counting marker positioning, one quarter-inch squares can be printed at each corner of each ticket so that they equally straddle the perforation lines separating adjacent tickets. These counting squares are printed with opaque ink. The ticket dispensers currently in use that originally vend tickets to the player require an opaque area for counting as they dispense tickets. The dispenser counting mechanism senses light passing through the paper and the translucent bar code printing, but as the opaque area passes the counting sensor a signal is generated by the interruption of the light passing through the paper. This signal is used to count the number of tickets dispensed. Similarly, the tickets passed through the present invention use this same opaque area for counting signal generation. Thus, in the configuration described above, the counting sensors can read four portions of the ticket. More importantly, by placing counting markers on both ends of one side of the ticket and at both corners of both ends, and by configuring the printing layout with bar codes on both edges of the other side of the ticket, either end of the ticket can be inserted and run through the present invention. However, the invention is not limited to the herein described positioning of the counting markers. The key requirement for both the bar codes and the counting markers is that they be printed in the longitudinal bands so that the reading sensors can see them. This method of locating the information to be sensed and transporting the tickets is not only applicable to the new "paper" tickets but also to "standard" and card stock tickets.

The Transport Mechanism

The concept of the transport mechanism is that as a ticket is inserted into the counting machine it is gripped between two endless belts moving at the same speed. The belts transport the ticket past sensors that generate counting signals and read the bar code. The sensors send the signals they have generated to a computer program for data processing and analysis.

Refer to the figures. Tickets are inserted through a slot, the width of which is the width of the tickets to provide good alignment of the ticket for passing by the sensors. Optical sensor H, located at the insertion slot, detects the presence of the ticket as it is inserted and starts the motor (not shown) that drives wheels A and C over which endless belts E and F pass. Wheels A and C are preferably, but not necessarily, of the same diameter. In any case, they are sized and geared together to rotate in opposite directions to produce the same tangential velocity so that belts E and F are moved linearly in the same direction at essentially the same speed. The same belt speed is essential to prevent bunching, stretching or tearing of the tickets. As the ticket is inserted and as the belts begin to move, the leading edge of the ticket is gripped tightly between them and the ticket then moves along with them.

Belt F is a flat belt sufficiently narrow to permit the ¼ inch bands on each longitudinal edge of the ticket to extend over the edge of the belt so that sensors, viewer 1 and viewer 2, can read the ticket as it passes by them. Belt E is a small, round belt whose function is to provide pressure on the ticket and lower belt thus providing strong gripping of the ticket between the belts and thereby keeping the ticket properly aligned as it is transported through the machine. The machine is capable of handling different widths of tickets by adjusting the width of the insertion slot and by sizing the lower flat belt F to properly allow the sensors to see the edge bands. As an example, one standard width for a ticket is 1$\frac{5}{32}$ inches. For such a ticket, belt F could be ⅜ to ½ inch wide. Pressure belt E would be about ⅛ inch diameter.

Rollers B and D are freewheeling and rotate with the movement of the two belts. Roller G is an idler roller used to keep the two belts pressed together until after the ticket has passed the sensors.

Pressure P on the belts can be controlled by adjusting the spacing between the drive wheels A and C. Generally, the tickets will be fed through the machine in a continuous string. The pressure should be adjusted so that the belts will grip the ticket string sufficient to draw it into the machine but light enough to avoid tearing the string apart at a perforation if a person continues to hold the string after inserting the first ticket.

Viewer 1 reads the upper side of the ticket. Viewer 2 reads the under side of the ticket. One viewer sees the opaque area and the color of the ticket and generates a series of short pulses and one long pulse. These pulses can be used to count the tickets.

The other viewer sees the pulses created by the bar code. This reading can be used to verify that the ticket is from the establishment operating the games, or to identify the particular game played, or to distinguish between tickets of different redemption values. These readings are sent to the computer program for interpretation and accounting.

After passing by the sensors and over the roller G the tickets exit the counting mechanism and go to waste processing for destruction by conventional means.

The string of tickets continues passing through the mechanism until the string ends. When there are no more tickets entering the slot, optical sensor H allows the motor to run long enough to pass the last of the ticket string through the mechanism and then shuts off the transport motor until the next string of tickets is inserted.

The customer can repeat this process for additional strings of tickets until all tickets have been counted. A "Finished" button is then pressed, ending the counting sensory process. This signals the computer program that the batch scanning process is completed and that the tallying and accounting processes can be activated.

The Computer Data Processing Program

The pulses generated by the sensors, viewer 1 and viewer 2, are transmitted to the computer containing the data processing program, where they are tallied and sorted. A receipt for the customer is printed. The receipt can include a receipt number, the bar code of the establishment, the number of tickets and other pertinent information.

The computer program can keep a log of receipts printed. The business' personnel may access this log for verification of receipts and accounting purposes.

The data processing program can be capable of receiving data and processing data from a plurality of ticket counting machines and combining that data into an overall report of the activity for the entire business enterprise.

The tallying program on the computer can be accessed from a remote computer, thereby providing greater flexibility for management access to the data reports thereby affording economies of time and equipment.

The Display Monitor

The display monitor is located at or near the ticket counting machine so the customer can view it as the tickets are processed. The monitor is used to display either of or both the ticket counting results or, for entertainment purposes, graphical material of almost any variety that is of interest to the customer. For example, the monitor could, while the ticket counting process is taking place, show entertainment, such as short movie clips, or cartoons. The customer could play trivia or quiz games, or interactive dexterity games, etc. for which bonus amounts of tickets could be awarded. The bonus tickets would encourage additional play. The monitor could display video and audio advertising. The video display would be more fin for the customer and more interesting than an LED display, thereby encouraging use of the counter, especially when large numbers of tickets require lengthy counting times.

I claim:

1. A ticket counter comprising:

a transport mechanism for transporting tickets, said tickets having first and second longitudinal edges substantially oriented parallel to a direction of travel of said tickets in said transport mechanism, from an inlet, past a sensor, said transport mechanism maintaining contact with the tickets while exposing said first and second longitudinal edges of the tickets;

a sensor adjacent the transport mechanism and positioned to read one of said first and second exposed longitudinal edges of said ticket while said ticket is being transported by the transport mechanism, the sensor determining a quantity of tickets transported by the transport mechanism past the sensor and generating a signal corresponding to said quantity;

a computer in communication with said sensor for receiving said signal from the sensor; and a receipt generator connected to said computer for printing the quantity of tickets transported by the transport mechanism past the sensor.

2. The ticket counter of claim 1 further comprising a video display screen connected to the computer.

3. The ticket counter of claim 2 wherein the display screen displays animation while the tickets are being transported by the transport mechanism.

4. A The ticket counter of claim 2 wherein the display screen displays a quiz while the tickets are being transported by the transport mechanism, said ticket counter further comprising input means to allow a user to respond to the quiz displayed by the display screen.

5. The ticket counter of claim 2 wherein the display screen displays advertisement.

6. The ticket counter of claim 2 wherein the display screen displays a game of dexterity while the tickets are being transported by the transport mechanism, said ticket counter further comprising input means to allow a user to participate in the game of dexterity.

7. The ticket counter of claim 1 wherein the computer records information encoded on the tickets.

8. The ticket counter of claim 7 wherein the information encoded on the tickets includes the distributor of the tickets.

9. The ticket counter of claim 7 wherein the information encoded on the tickets includes a time that the tickets were distributed.

10. The ticket counter of claim 1 wherein said transport mechanism comprises a pair of opposed endless belts rotating in opposite directions at a common speed to carry the tickets therebetween, at least one of the pair of endless belts having a width less than the width of the tickets to enable the sensor to read one of the longitudinal edges of the tickets.

11. The ticket counter of claim 1 further comprising a ticket shredding mechanism for destroying the tickets transported by the transport mechanism past the sensor.

12. The ticket counter of claim 1, wherein the sensor detects light passing through the tickets.

13. The ticket counter of claim 1, wherein the sensor interprets bar codes imprinted on the tickets.

14. The ticket counter of claim 1, wherein the sensor is positioned to interpret bar codes imprinted on one of the first and second longitudinal edges of the tickets.

15. The ticket counter of claim 1 wherein the sensor is adapted to interpret bar codes imprinted with translucent ink.

16. The ticket counter of claim 15 wherein the translucent ink comprises a fluorescent ink.

17. The ticket counter of claim 1 further comprising a second sensor positioned at one of said first and second longitudinal edges of the tickets to read information printed on said one of said first and second longitudinal edges of the tickets while said tickets are being transported by the transport mechanism.

18. The ticket counter of claim 1 wherein the sensor is adapted to recognize counting markers imprinted on the ticket and determine a quantity of tickets passing by the sensor by the number of recognized counting markers on the tickets.

19. The ticket counter of claim 18 wherein the counting markers correspond to a geometric shape spanning two adjacent tickets and bisected by perforations separating the two adjacent tickets.

20. The ticket counter of claim 18 wherein the markers are imprinted with an opaque ink.

21. The ticket counter of claim 18, wherein the counting markers occur on a common edge of the tickets with a bar code imprinted on the tickets.

22. The ticket counter of claim 1 further comprising an optical sensor for actuating the transport mechanism upon detection of a ticket at the inlet.

23. The ticket counter of claim 1 further comprising a second sensor to read an opposite side of the tickets while the tickets are transported by the transport mechanism.

24. The ticket counter of claim 1 further comprising user input means for terminating the ticket counting process and initiating a receipt print operation.

25. The ticket counter of claim 1 further comprising data transmitting means for transmitting data recorded by the computer to a remote computer.

26. A ticket counting machine comprising:

a transport mechanism for moving translucent tickets from a ticket receiving inlet, past a ticket counting station, to a ticket destruction station;

a light source positioned at the ticket counting station along a path defined by the travel of a longitudinal edge of a translucent ticket, said light source located so as to transmit light through a translucent portion of said ticket along said longitudinal edge and so as to not transmit light through an opaque portion of said ticket along said longitudinal edge;

a sensor positioned at the ticket counting station for sensing light passing through said longitudinal edge of the translucent ticket at the translucent portion and for sensing no light passing through said translucent ticket at said opaque portion, and generating a signal based upon the sensing of said translucent portions and said opaque portions of said ticket;

a processor for receiving said signal and displaying a total number of tickets moved by the transport mechanism; and a ticket destruction mechanism for cutting tickets at the ticket destruction station.

27. The ticket counting machine of claim 26 further comprising a barcode reader at said ticket counting station for reading a bar code imprinted on the ticket at said longitudinal edge along said translucent portion of said ticket.

28. The ticket counting machine of claim 26 further comprising video display means for generating a video image during a ticket counting operation.

29. The ticket counting machine of claim 26 further comprising a receipt generating device coupled to the processor for printing a receipt including a total number of tickets counted by the sensor.

* * * * *